UNITED STATES PATENT OFFICE.

HENRI FREDET, OF BRIGNOUD, FRANCE.

PROCESS FOR THE PRODUCTION OF ACTIVE MATTER FOR ACCUMULATORS WITH MIXED OXIDS.

No. 854,940.          Specification of Letters Patent.          Patented May 28, 1907.

Application filed January 2, 1904. Serial No. 187,754.

*To all whom it may concern:*

Be it known that I, HENRI FREDET, a citizen of the Republic of France, and a resident of Brignoud, Isère, France, have invented certain new and useful Improvements in Processes for the Production of Active Matter for Accumulators with Mixed Oxids, of which the following is a specification.

Although the use of negative pole-electrodes composed of mixed oxids has become very general in all kinds of accumulators, this is not the case with positive pole-electrodes of the same type. The superiority of positive pole-electrodes of mixed oxids over the plates of Planté formation, both as regards the specific capacity and the cost of manufacture, is, however, undoubtable. But while they are employed at great cost of maintenance in numerous transportable installations where the question of specific capacity is paramount, the inevitable breaking away of active matter at short intervals prohibits their use in stationary installations.

The present invention has for its object to afford to such positive pole-electrodes the same amount of durability as the negative pole-electrodes, and at the same time, to obtain other advantages, by a chemical process that can be industrially applied with economy and simplicity, as demonstrated by experiments with a view to combat the principal causes of the disintegration of the active mass at the positive pole; to obviate the sulfating at the negative pole and the secondary actions due to the impurities of the electrolyte.

The purpose in view was, firstly, to obtain without compression a perfect cohesion of the paste; secondly, to preserve the outer layers from a too energetic electrolytic attack; thirdly, to enable the acidity of the electrolyte, and consequently the extent of output to be increased without danger; fourthly, to eliminate, if necessary, from the electrolyte the following dangerous impurities; the platinum resulting from the concentration of sulfuric acid in platinum receptacles; the arsenic resulting from the roasting of the pyrites; the nitrous products that may come from the lead chambers. I have discovered that these complex desiderata, having no apparent correlation with each other, can be attained simultaneously by the addition of a single compound to the mixture of lead oxids, which constitutes the active element of the electrodes; this chemical reagent is liquid hydrosulfid of ammonia.

The hydrosulfid of ammonia, as will be explained later on, causes an increase of the specific weight of the active matter and affords the paste a remarkable degree of density and cohesion, without the aid of any compression, it causes the formation on the positive pole-electrodes of a superficial protective coating of lead sulfate, and at the same time it indirectly preserves the negative poles from the sulfating, so that it allows the acidity of the electrolyte to be increased without detriment. Lastly, it precipitates in the form of insoluble salts the platinum and the arsenic, and effects the decomposition of the nitrous products of the electrolyte.

Hydrosulfid of ammonia is produced by the direct action of sulfureted hydrogen upon an ammoniacal solution according to the reaction

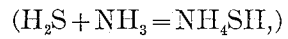

which is again treated by an excess of $NH_3$;

The oxidizing action of the air gradually causes the production of sulfids increasing in richness and finally hyposulfite of ammonium. The hydrosulfid of ammonia is therefore in reality a complex mixture of sulfureted hydrogen, of ammonia, of hydrosulfid, of sulfids, of polysulfids, and hyposulfite of ammonium.

When the mixture of lead oxids serving to cover the supports of any kind for producing the electrodes has been mixed with liquid hydrosulfid of ammonia, this chemical agent will produce the following multiple reactions either directly during the course of the manufacture of the plates, or indirectly by its action combined with the chemical effects of the electrolyte and of the electrolytic phenomena.

A. *Preparation of the Paste.*

The bodies present in the paste before immersion of the electrodes in water acidulated with sulfuric acid, are as follows:—Sulfids of lead (direct action of the hydrosulfid on the oxid), lead oxids, polysulfids, ammonium hyposulfite, insoluble salts of lead (action of the ammonia upon the oxid), lead sulfate (superficial oxidizing action of the air during the drying) and various inert bodies. Experiment has shown that the presence of these various bodies in active matter produces without requiring any compression, a very considerable increase of its specific weight. Thus, one and the same plate coated with paste according to the various processes at present in use (acid pastes, ammonia pastes, alkaline sulfate pastes, etc.) has a weight of active matter from 20 to 35 per cent less than those obtained by the said hydrosulfid process. This increase of density causes naturally a proportionate increase of the cohesion of the mass.

B. *Immersion of the Electrodes in Water Acidulated with Sulfuric Acid.*

When the plates are plunged in the electrolyte, there is produced a precipitation of sulfur in an impalpable powder within the body of the paste (action of the sulfuric acid on the polysulfids and the ammonium hyposulfite). This finely divided sulfur incloses the active matter as though in a net of very small meshes, and it cements, so to speak, the particles together.

The exceedingly fine subdivision of the precipitated sulfur, which is a perfectly inert body in the active paste, prevents it from forming an obstacle in the electrolytic action. On the other hand, when the plates are immersed in the bath ammonium sulfite is produced, (action of the sulfuric acid upon the ammoniacal products). According to a known reaction, the ammonium sulfate decomposes the nitrous products that may come from the sulfuric acid chambers, and at the same time preserves the negatives from attack when in open circuit.

C. *Electrolysis.*

(a) *Charging.* During the charging a reduction of the negative pole-electrode and an oxidation of the positive pole-electrode will take place. The sulfid of lead of the positive pole-electrode is consequently oxidized and transformed into sulfate. The lead sulfate, which is hurtful under certain conditions to the negative pole-electrode, on the contrary preserves by its relative insolubility, the peroxid of the positive pole-electrode from a rapid decomposition.

(b) *Discharging.* In discharging in any lead accumulator, the lead at the negative pole-electrode and the peroxid of lead at the positive pole-electrode are partially transformed into normal sulfate resulting in a decrease of the degree of acidity of the electrolyte according to the reaction.

$$PbO_2 + Pb + 2SO_4H_2 = 2SO_4Pb + 2H_2O$$

There is also produced lead oxid at the negative pole-electrode, while a part of the peroxid of the positive is brought back to the condition of a lower oxid. In addition, according to the present system, there is effected a superficial sulfurization by polarization at the negative due to the electro-positive transport of the sulfureted anions. This latter reaction maintains a layer of lead sulfid at the negative electrodes which preserves them from hurtful sulfating, that is to say, the production on their surface, in the event of an exaggerated discharge, of a non-reducible sulfate.

Any too energetic oxidation of the positive electrodes during the charging or the sulfating of the negative electrodes during the discharging being no longer to be feared according to the present invention, the acidity of the electrolyte can be very considerably increased with a corresponding increase of the capacity and output. Lastly, the sulfureted hydrogen that appears when the electrodes are immersed in their bath and during the first electrolysis precipitates in the form of insoluble sulfids all traces of platinum and of arsenic which like the nitrous products are contained in an insufficiently purified acid.

It will be seen from the above that the addition of hydrosulfid of ammonia is more particularly advantageous for the positive plates; it may, however, also be used in a suitable proportion in the preparation of the negative plates.

Having thus described my said invention, what I claim as new therein and desire to secure by Letters Patent, is:—

1. The process of making an active material for accumulator plates, which includes the mixing of lead oxid with ammonium hydrosulfid, substantially as described.

2. The process of making an active material for accumulator plates, which includes the mixing of different oxids of lead with ammonium hydrosulfid, substantially as described.

3. The process of making an active material for accumulator plates which includes mixing oxid of lead with ammonium hydrosulfid and precipitating the sulfur from the hydrosulfid on the surface of the mass.

In testimony, that I claim the foregoing as my invention, I have signed my name in presence of two subscribing witnesses.

HENRI FREDET.

Witnesses:
 HERNANDO DE SOTO,
 HENRY THIESSE.